W. E. HAUPT.
AUTOMOBILE TRANSMISSION MECHANISM.
APPLICATION FILED MAR. 25, 1914.
1,230,896.
Patented June 26, 1917.
2 SHEETS—SHEET 2.
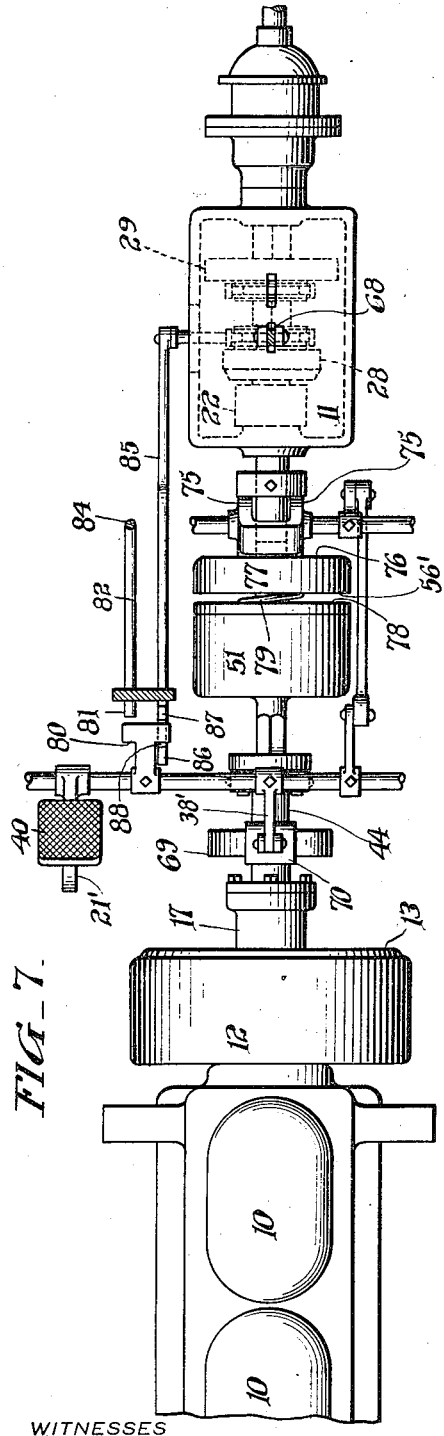
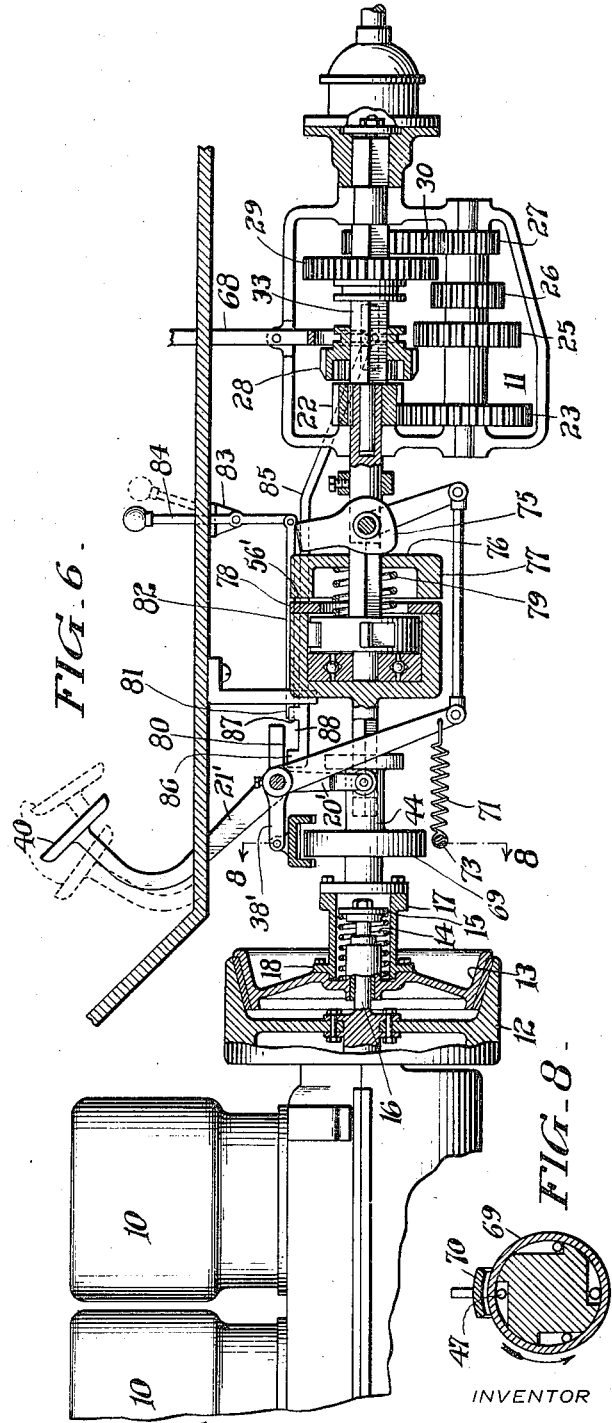
WITNESSES
INVENTOR
William E. Haupt
BY
ATTORNEY

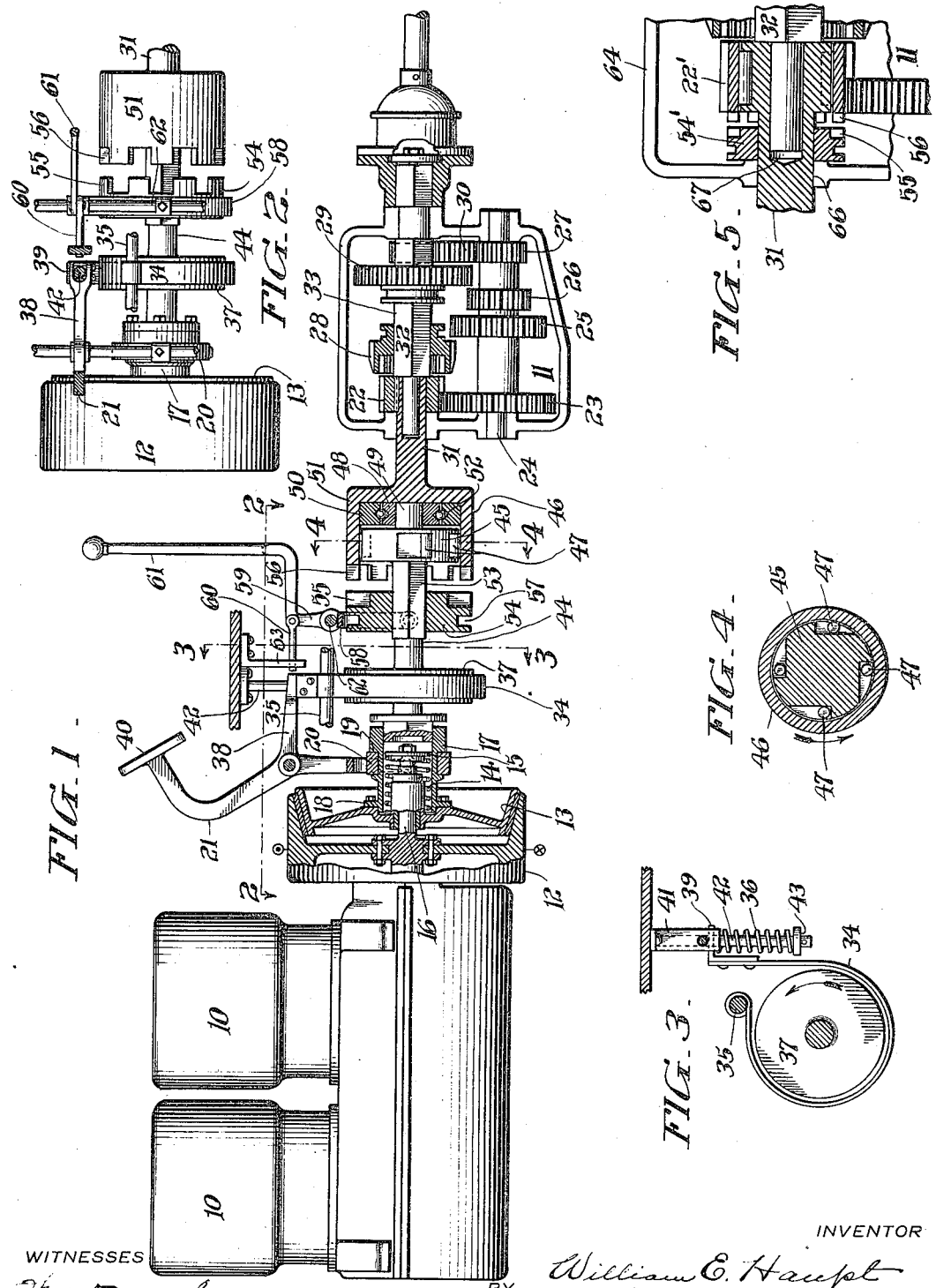

UNITED STATES PATENT OFFICE.

WILLIAM E. HAUPT, OF PHILADELPHIA, PENNSYLVANIA.

AUTOMOBILE TRANSMISSION MECHANISM.

1,230,896.   Specification of Letters Patent.   Patented June 26, 1917.

Application filed March 25, 1914.   Serial No. 827,055.

*To all whom it may concern:*

Be it known that I, WILLIAM E. HAUPT, a citizen of the United States, residing at Philadelphia, in the county of Philadelphia and State of Pennsylvania, have invented a certain new and useful Automobile Transmission Mechanism, of which the following is a specification.

My invention relates particularly to mechanical movements by which a motor or other source of power is connected to its work through relatively heavy clutch members, usually of the friction type, and gear changing mechanisms. Since it will find its greatest extent of use in automobile constructions I have illustrated it in this connection, recognizing, however, that its usefulness will not be confined to this field of use.

The purpose of my invention is to automatically disconnect the gear changing mechanism from the relatively heavy driven clutch member, shafting, universal joints, etc. during the shifting of the gears, so as to relieve the gearing of the strain caused by the inertia due to these parts, reducing the noise and jar and the time required for the change.

A further purpose of my invention is to interpose an overrunning clutch between the motor or engine clutch and the gear changing mechanism and, preferably, to increase the braking effect upon the driven motor clutch member and adjoining shafting so that when the motor or engine clutch is disconnected the parts will come to almost an immediate stop.

A further purpose of my invention is to provide a clutch brake for use in connection with friction-clutch operating levers and gear changing mechanism which shall be effective to bring the driven clutch member and associated parts to a quick stop when the clutch is disconnected (*i. e.*, effective to stop rotation in the same direction as the engine) and, preferably, to permit free movement of the driven clutch member and associated parts in the opposite direction.

A further purpose of my invention is to provide convenient and effective means, in connection with gear changing mechanism and operated separately or in conjunction with other operations, for positively locking the overrunning clutch, *i. e.*, making it drive in either direction, and at the same time preferably either reducing the clutch braking effect or rendering the clutch brake wholly inoperative. At the same time I may limit this feature to any predetermined gear-changing combinations if desired and desire not to be limited to purely mechanical means for this.

A further purpose of my invention is to allow free shifting of gears under all conditions, regardless of the clutch weight, car speed or any drag or sticking of the clutch such as might arise through bad design, lack of lubrication or need of repair.

A further purpose of my invention is to provide for coasting ahead when driving ahead, or for coasting backward when driving backward, while preventing movements in the reverse directions.

A further purpose of my invention is to either allow the car to automatically coast when in gear with the motor on any gear ratio desired, or all of them as desired, or to use the motor as brake but only on the lower gears where it is effective and automatically preventing the use of the motor as a brake on the higher gears where it is not only practically useless but also detrimental to an extent in excess of the benefit.

A further purpose of my invention is to provide for smoother running in single jointed "universal" power transmission or other forms of transmission by unbalanced driving means, greatly smoothing out the irregular impulses of the transmission by my mechanism.

A further purpose of my invention is to relieve the motor and transmission shafting, gearing, etc., from strain arising from the tendency of the driven parts to vary in speed relatively with respect to the motor when going over rough road.

A further purpose of my invention is to prevent loss of car speed by preventing braking of the car either by the motor or by the clutch brake or drag during gear changing, correspondingly reducing the wear upon the clutch, brake and trunnion parts.

A further purpose of my invention is to prevent wear of the clutch throw-out trunnion while the clutch is held out and the car is running with the gear in mesh.

A further purpose of my invention is to make the present interlocking system between the clutch lever and the gear shifting lever of greater value.

I have preferred to illustrate my invention by two forms thereof which are practical, efficient and relatively inexpensive and which at the same time well illustate the principles of my invention, recognizing, however, that these are illustrative only and in no sense definite of the many forms in which the advantage of my invention might be secured.

Figure 1 is a side elevation, partly in longitudinal section, of the motors and connections therefrom through the gear changing mechanism in an automobile embodying my invention.

Figs. 2, 3 and 4 are sections taken on lines 2—2, 3—3 and 4—4 respectively, of Fig. 1, looking in the direction of the arrows.

Fig. 5 is a broken longitudinal section showing a modification of a portion of the structure shown in Fig. 1.

Fig. 6 is a broken elevation, partly in longitudinal section, similar to Fig. 1 and of a second form of my invention.

Fig. 7 is a top plan view of the structure seen in Fig. 6.

Fig. 8 is a section taken upon line 8—8 of Fig. 6 looking in the direction of the arrows.

In the illustration the motors 10—10 are connected with the speed changing gearing 11 through the normal friction clutch having driving member 12 and driven member 13 rotating in the direction shown by the point and tail of the arrows.

I have selected the motor, clutch and gear changing mechanism shown as conventional types. With those inventions *per se* I have had no part and my description of these members here given is merely for the purpose of describing one form capable of use as required by the statute.

The friction clutch normally acts somewhat as a fly wheel because of the necessary weight of the parts. This is true as to both of the elements 12 and 13. In changing gearing this action of the part 13 is detrimental.

I have endeavored to eliminate this fly wheel effect of the driven member 13 and the inertia of the connecting shafting between it and the gear box from the ordinary problems of speed changing, so that as little mass is connected with the gear changing mechanism as possible on the motor side of the gear changing mechanism. After the clutch is disconnected the driven gears of the gear changing mechanism, which continue to be rotated by reason of the continued movement of the car will gradually reduce in speed and will carry the rest of the speed changing mechanism with them, unless and until the gearing has been disconnected preparatory to making the new gear combination.

In prior constructions, what I will call the driving part of the gear changing mechanism, i. e., the part nearest the motor, has been rigidly connected with the driven member of the motor clutch.

The result has been that the combined inertia of the driven clutch member shafting and gearing, operating as a unit, has seriously affected gear changing. It has been necessary to speed up or retard all of these parts together when a new gear combination was to be made.

When the gearing has not been disconnected immediately after disconnection of the clutch, the clutch brake is given a duty for which it was never intended nor designed, slowing down or stopping the entire car; and the drag of the clutch brake binds the movable gear so tightly upon its shaft that it is hard to slide this gear out of mesh. The wear upon the clutch brake is very great under these circumstances and gear shafting requires excessive effort.

The "coasting" of the vehicle or driven machinery causes the gearing to continue to rotate at the decreasing speed referred to. The clutch brake normally applied in existing systems at the same time that the engine clutch is disconnected, slows down all of the connected mechanism and would ultimately stop it. When the driving gearing is disconnected from the driven gearing the brake slows down the driven clutch member, shaft and driving gearing only and the driving gearing, as it slows down, passes through the exact speed at which connection should be made to gear up the gear shifting mechanism to a higher gear ratio; and it is possible for an expert to gage the speeds so nicely as to enter the new gear ratio at just the correct time and so shift into higher gear from a lower gear substantially without noise or jar. In so far as my invention affects shifting from a lower into a higher gear, it is intended to enable the novice to shift the gears with as much ease and safety as an expert.

Shifting to a lower gear now requires that the driven clutch member, shaft and driving gearing be speeded up with respect to the driven gearing, directly contrary to the normal operation above. For this reason there is no correct time nor point at which this shift can be made without strain even by an expert. I aim to simplify this by separating the driven clutch and shaft from the driving gear parts which must be speeded up, greatly reducing the inertia of the parts to be slowed down or speeded up.

The member 13 is shown as pressed into normal contact with the female clutch member 12 by spring 14 pressing against the member at one end and at the opposite end pressing against a plate 15 secured to the member 12 by shaft 16.

The sleeve 17 is also secured to the member 13 as by flange 18 and is annularly grooved at 19 to receive the yoke 20, by which the driven clutch member 13 is disengaged from the driving clutch member 12. This disengagement is effected as in normal clutch release by a lever 21.

The gear changing mechanism illustrated may also be of any well known type. I have selected a common form which comprises a gear 22 coaxial with the clutch shaft and meshing with a gear 23 upon a countershaft 24 carrying gears 25, 26 and 27 to mesh respectively with gears 28 and 29, coaxial with gear 24 but rotatable with respect to it, and 30 upon a second countershaft and constantly in mesh with gear 27 for reversal of driving direction. The gear 22 is rigidly mounted upon a driving shaft 31 and, for high gear, is engaged by internally toothed gear 28 upon driven shaft 32. The gears 28 and 29 are shifted along the squared part 33 of shaft 32 by any suitable yokes fitting within the annular recesses shown. The intermediate speed is obtained by shifting gear 29 into engagement with gear 25 so that the driving takes place through gears 22, 23, 25 and 28. The low gear drives through gears 22, 23, 26 and 29.

The clutch release lever 21 performs braking functions, as is true of existing forms, but I provide for quicker and stronger braking action than is required and used with present forms and prefer to have the brake effective against one direction of rotation of the shaft only. I show different arrangements for securing this result in Figs. 1 and 6.

In Fig. 1 (see also Fig. 3) I utilize a band brake 34 supported at one end from any relatively fixed part by pin 35 and forced upwardly at the other end by spring 36 when the brake is to be applied. As will be seen, this brake is effective against movement of the braking drum 37 in the direction of the arrow (Fig. 3) only and will tend to release with movement in the opposite direction.

The spring 14 is so much stronger than the spring 36, that the arm 38 of the clutch release lever 21 normally holds the terminal 39 down in the position shown in Fig. 3 with the brake released. When, however, the pedal 40 is pressed down to release the friction clutch the movement of the lever lifts the arm 38, permitting the brake to be applied by spring 36, except as hereinafter pointed out. When the pressure is removed from the pedal 40, the brake is released by reason of the return of the lever 21 to the position shown in Fig. 1.

I have shown a common form of band brake to indicate that the form thereof was unimportant, providing the function was performed, and have conventionally illustrated the connections between the terminal 39 of the band brake and the spring 36, etc., as one only of many forms of connection of these parts. In this form a rod 42 secured to any relatively fixed part acts as a guide for the movement of the terminal 39 and this guiding rod 42 terminates in an abutment 43 against which the spring engages at one end. The terminal 39 is apertured to pass over the rod and receives the thrust of the other end of the spring which spring surrounds the rod and is thus held to its duty.

It will be evident that the release of the friction clutch will immediately permit the band brake to be set, so far as described. On account of the preferred unusual strength of the brake, the rotating parts will be brought to a stop quickly, particularly as I provide for continued movement of the driven mechanism including the gear changing parts, free from the driven clutch member, shaft and brake drum now being considered.

The function of the brake is to insure that the parts upon the driven or gear-changing side of the overrunning clutch move faster than those upon the driving or engine side thereof. It will be evident that this condition would always obtain when changing from a higher to a lower gear. On the other hand, when changing from a lower to a higher gear, the reverse would be true, unless and until the driving members between the friction clutch and the overrunning clutch are slowed down to the required extent. The brake provided accomplishes this slowing operation quickly and surely. It is not objectionable when changing from higher to lower gear and is highly advantageous when changing from lower to higher gear.

The shaft 44 is rotated by the clutch member 13 and is in this form rigidly secured to the brake wheel 37. It also carries one member, here shown as the internal member 45, of an overrunning clutch, whose outer member 46 is free from the inner member to rotate thereon in one direction of relative rotation without causing gripping of the rolls 47 so that the outer member 46 (in this form connected with the driving part or end of the gear changing mechanism) can continue to rotate in the direction indicated by the arrow point and tail in Fig. 1, notwithstanding that the shaft 44 has been brought to a stand still. This interposition of the overrunning clutch makes it possible for the entire mechanism to the right of the clutch to continue its movement in the direction in which it was being driven, without driving the shaft 44 nor the parts carried by it.

This permits coasting in the direction in which the vehicle was being driven, while any movement of the vehicle in the opposite direction immediately sets the clutch shown in Fig. 4.

I support the shaft 44 at the end carrying the clutch member 45 without appreciable friction by a bearing between the outer and inner overrunning clutch parts. In the construction shown I place one part of a bearing, 48, upon the end of the shaft 49 and insert the other bearing part 50 within the casing 51 rigid with the outer overrunning clutch member 46. I use balls 52 between the parts of the bearing. I thus secure ball bearing support of overrunning clutch members close to their clutching point, reducing the friction therebetween.

If the outer clutch member 46 is rigidly secured against rotation with respect to the inner clutch member 45 or the shaft 44, the overrunning clutch is effectively cut out and the operation of this part of the mechanism, except for the weight of the overrunning clutch parts, is the same as if the clutch structure had not been included. Because some users might at times prefer to utilize my construction in this way in emergencies, or for special purposes, I have provided the shaft 44 with a section 53 of non-circular cross section and have mounted a jaw coupling 54 upon it to shift longitudinally thereof, so that its clutch parts 55 can be made to engage with a corresponding jaw coupling 56 rigid with the member 46, providing an effective coupling between the shaft and outer clutch member 46.

I recognize that any form of bolt, clamp or clutch connection between the parts here could be utilized which would cause one of the parts to rotate at the same speed as the other in both directions and have illustrated the form selected merely as a convenient and simple form of illustration of this structure. I have conventionally provided it with a groove 57 so that it may be shifted by a yoke 58 through any separate lever 59.

When the brake utilized in connection with my overrunning clutch is of my preferred quick acting type it is desirable to prevent the brake from operating when the teeth 55 and 56 are in engagement so that the brake shall not unduly strain the automobile or other gearing nor stop the machinery too quickly. In order to automatically block the brake 34 against operation when the clutch teeth 55 and 56 are in engagement, I have conventionally shown a rod 60 connected with the lever 61 above its pivot point 62 and guided within bracket 63, so that this rod 60 will pass into the space above the terminal 39 when the clutch jaws are connected and prevent the terminal 39 from lifting to set the brake 34.

Obviously, the overrunning clutch utilized might be placed within one of the other parts illustrated to gain a part at least of my advantage. In order to show that this is recognized by me, I have shown the clutch in Fig. 5 as inside the gear 22' within the gear casing 64 and I consider this clutch as just as truly between the friction clutch 12, 13 and the gear changing mechanism, as if it were in the position shown in Fig. 1, since it provides an effective slip in one direction as compared with all of the gear changing mechanism and grips for movement in the opposite direction thereto.

In this form in Fig. 5 the clutch member 54' is shown also as within the gear casing and can be shifted therein by any suitable mechanism. The teeth 55 and 56 are similarly located with respect to each other as in Fig. 1. However, I have here splined the clutch member 54' upon the round shaft 31 so as not to interfere with the rotation of this shaft within the bearing at 66.

In this, as in the other form, the end of the shaft 31 is recessed to form a support for a projecting pin 67 from the shaft 32.

In the form shown in Figs. 6 and 7 the engine clutch members and gear changing members are of identical form with those shown in Fig. 1. One of the gear changing levers has been illustrated at 68. The differences intended to be shown in Figs. 6 and 7 are with respect to the type of brake, the manner by which it may be made to engage in one direction and runs free in the opposite direction, the operation of the coupling, here of different form, automatically or not, as desired, to cut out the overrunning clutch when the friction clutch pedal is fully released, the cutting out of the coupling and the selective cutting out of either an engine clutch or an overrunning clutch at will by the clutch pedal.

The brake wheel 69 is engaged by a brake shoe 70 attached to the lever 21', so that release of the friction clutch 12—13 will be accompanied normally by setting the brake shoe against the brake wheel. Between the brake wheel and the shaft 44, I place an overrunning clutch in such position that the shaft 44 will rotate the brake wheel when the shaft is driven by the engine but can rotate within the brake wheel in the opposite direction. The brake shoe will thus be effective to stop the rotation of the clutch member 13 and its attached parts in the direction of engine rotation but will allow them to move in the opposite direction.

In this form I place a spring 71 between an extended arm of the clutch lever and any suitable stop 73, so as to perform the same function as the spring 36 in tending to release the friction clutch. I provide for three possible positions of the clutch lever, as shown in full and dotted lines in Fig. 6. The position shown in full lines corresponds to the position of friction clutch engagement; that shown at the left corresponds with disengagement of the friction clutch and operation of the brake shoe against the brake wheel; and that shown at the right provides for cutting out the overrunning clutch shown in Fig. 4. I also provide stops which can be used to prevent the lever from moving to the position shown at the right, preventing the coupling shown from engagement.

The lever 21' releases the friction clutch member by means of yoke 20' and at the same time the arm 38' forces the brake shoe down upon the brake wheel. With the parts in the position shown, if pressure upon the pedal 40 be removed, the spring 71 will force the lever 21' to the position at the right in Fig. 6. This operates a coupling by a device, here the cam 75 bearing against the face 76 upon any suitable friction coupling member 77 whose face 56' then engages with the friction disk 78. This disk may either frictionally engage or be mounted upon the outer member of an overrunning clutch similar in all particulars to the overrunning clutch construction shown in Fig. 4, except that the relations of the parts are reversed. The outer member is connected with the friction clutch member 13 in the form of Fig. 6, while the inner member is so connected in the form of Figs. 1 and 4. When the lever 21' is pushed to the position shown in full lines or to the left of that position, the spring 79 separates the coupling members to the position shown in Fig. 6.

It will thus be seen that the three positions of my clutch pedal result in the following three combinations. In the dotted position of the pedal at the left, in Fig. 6, the engine clutch is released and the clutch brake is applied. In the position of the pedal shown in solid lines, the engine clutch is engaged to drive and the clutch brake is released. In each of these two positions the overrunning clutch is effective to allow engine driving but to prevent the other parts from driving either the engine or the friction clutch forward. In the dotted position of the pedal at the right the engine clutch is engaged to drive and the clutch brake is released, both as in the position in solid lines, but the overrunning clutch is locked to render its overrunning feature inoperative by a coupling.

When the overrunning clutch is to be used at all times (without any use of the coupling) this may be done by interposing any stop to the extreme movement of lever 21' to the right. Two forms of stop are shown in Figs. 6 and 7. In one form a T-headed arm 80 from the lever 21' is blocked against full rocking movement by the end 81 of a rod 82 supported close to its duty by a bracket 83. This rod can be thrown by a lever 84.

The lever 21' can also be controlled so as to move to the extreme right in Fig. 6 for certain predetermined speeds only and I have so shown it as blocked against such coupling engagement in the high and intermediate speeds.

The gear shifting lever is shown in neutral position, permitting the low gear to be engaged. Moved to the right this lever completes intermediate gear connections and to the left engages the high gear. Upon some part of the lever 68, as upon the yoke connected therewith, I secure a rod 85 which is suitably guided so that its end comes beneath the T head of the arm 80. Two projections, 86 and 87 upon the rod are adapted to engage the T head when they are brought separately directly under it by movement of the lever 68 and the rod 85 in one direction or the other, thus blocking the full rocking movement of the lever 21' in the same manner as it is blocked by the rod 82. In the neutral position of the lever 68 and rod 85, the T head is free to rock, entering the space 88 between the two projections. Omission of either of the projections would allow full rocking of the lever 21' for the corresponding gear position.

Obviously my invention could be embodied in many different constructions capable of securing my results in varying degrees and I desire to secure the benefit of all such changes within the scope of my claims.

It will be evident that the use of the unidirectional clutch brake and the overrunning clutch together, as shown, makes it possible (except for the other brakes which can be applied) for the car to coast in either direction when the engine clutch is released with the gears in mesh and with the clutch brake set; but that either of these features can be used without the other, permitting coasting in only the one direction in that case. The overrunning clutch allows all of the mechanism on the transmission side of the clutch to coast in the same direction as that in which it is normally driven with the same gearing, without carrying with it the driven engine clutch member, clutch brake wheel and adjoining shafting.

With the engine clutch released and the one way clutch brake applied, coasting of the car in the opposite direction to that for which the transmission gearing is set will engage the overrunning clutch to rotate both of its members as well as the driven engine clutch member, the coasting member of the clutch brake and the shafting connecting them with the overrunning clutch. The clutch brake will not be effective. This permissible coasting in a direction opposite to that for which the transmission gearing is set is not ordinarily objectionable because the light clutch brakes now used are not relied upon to hold a car against coasting improperly on an incline and the transmission or wheel brake facilities now provided are used in existing cars under like circumstances and would be effective with my construction shown to prevent improper coasting in a direction opposite to that for which the driving connections are set.

It will be evident that my overrunning clutch finds its greatest usefulness when located on the variable speed transmission side of the clutch brake but that this is not the only location between the engine clutch and this transmission mechanism in which it would be valuable.

Where I use the term "overrunning clutch" in the specification and claims I mean to include in it all "one-way" clutches i. e., which allow movement of one part of the shaft with respect to the other in one direction of rotation and connect the parts of the shaft together in the opposite direction of rotation; without regard to the character of engaging medium between the parts of the clutch and whether one part of the clutch is physically outside of the other or not.

Having thus described my invention, what I claim as new and desire to secure by Letters Patent is:—

1. In a device of the character stated, an engine, a friction clutch connected therewith, gear changing mechanism connected with the driven member of the friction clutch and an overrunning clutch between the driven clutch member and the gear changing mechanism.

2. In a device of the character stated, an engine, a friction clutch connected therewith, clutch operating mechanism, coöperating clutch brake members operative when the clutch is released, gear changing mechanism, connections between the friction clutch and the gear changing mechanism carrying one of the brake members and an overrunning clutch between the friction clutch and the gear changing mechanism permitting continued operation of the gear mechanism in the direction in which it is normally driven after the brake has been set.

3. In a device of the character stated, an engine, a friction clutch connected therewith, clutch operating mechanism, coöperating brake members operative when the clutch is released, braking against rotation in one direction only, gear changing mechanism, connections between the friction clutch and the gear changing mechanism carrying one member of the brake and an overrunning clutch between the friction clutch and the gear changing mechanism, the overrunning clutch permitting continued operation of the gear changing mechanism in the direction in which it is normally driven after the brake has been set and the one way character of the brake permitting coasting of the car in the opposite direction when the brake is on.

4. In a device of the character stated, interrupted shafting, an engine clutch member connected with one end of the shafting, variable speed transmission gearing connected with the other end of the shafting and an overrunning clutch having one part connected with each of the interrupted parts of the shafting.

5. In a device of the character stated, an engine, gear changing mechanism, shafting between and two clutches interposed in said shafting, both operative at the same time and of different character.

6. In a device of the character stated, an engine, a clutch connected therewith, speed changing mechanism and connections between the clutch and speed changing mechanism embodying an overrunning clutch.

7. In a device of the character stated, an engine, an engine clutch, variable speed transmission mechanism, shafting connecting the clutch and mechanism and a one-way brake operating to stop the rotation of said shafting.

8. In a device of the character stated, an engine, an engine clutch, variable speed transmission mechanism, shafting connecting the clutch and the mechanism, a one-way brake operating upon the shafting, and common means for releasing the clutch and applying the brake.

9. In a device of the character stated, an engine, an engine clutch, variable speed transmission mechanism, shafting connecting the clutch and the mechanism, a one-way brake operating upon the shafting, and an overrunning clutch interrupting the shafting between the clutch and mechanism.

10. In a device of the character stated, an engine, an engine clutch connected therewith, variable speed transmission mechanism, connections between the clutch and mechanism, a one-way brake operating on the connections and a one-way clutch between the brake and transmission mechanism operating to run freely in the opposite direction from that in which the brake runs freely.

11. In a device of the character stated, an engine, an engine clutch connected therewith, variable speed transmission mechanism, connections between the clutch and transmission mechanism and a brake upon said connections.

12. In a device of the character stated, an engine, an engine clutch connected therewith, variable speed transmission mechanism, connections between the clutch and transmission mechanism and a brake upon said connections automatically set with release of the engine clutch.

13. In a device of the character stated, an engine, an engine clutch, variable speed transmission mechanism, shafting connecting the clutch and transmission mechanism, a brake for the shafting, an overrunning clutch between the brake and transmission mechanism, a coupling for said overrunning clutch rendering it inoperative, means for releasing the engine clutch and at the same time setting the brake and means for throwing the coupling adapted to render the brake inoperative when the coupling is thrown.

14. In a device of the character stated, an engine, an engine clutch connected therewith, a shaft connected with the clutch, an overrunning clutch connected with the said shaft, transmission gearing connected with the overrunning clutch, a coupling adapted to cut out the overrunning clutch and coöperating means for operating the engine clutch and the last clutch.

15. In a device of the character stated, an engine, an engine clutch connected therewith, a shaft connected with the clutch, a brake operating to brake said shaft, an overrunning clutch connected with said shaft, transmission gearing connected with the overrunning clutch, a coupling adapted to lock the overrunning clutch, operating mechanism for the engine clutch adapted to set the brake in operation and operating mechanism for the coupling adapted to block the application of the brake.

16. In a device of the character stated, an engine, an engine clutch connected therewith, interrupted shafting connected with the clutch, a brake member connected with the shafting adjacent the friction clutch, an operating lever for one friction clutch member, a brake member connected with said lever coöperating with the first brake member, an overrunning clutch connected with the two parts of the shaft to rotate one by the other in one direction and allow movement between them in the opposite direction, coupling parts connected with the two parts of the shaft and one of them movable, a device engaging the movable coupling part to connect the coupling parts and render the overrunning clutch inoperative so far as allowing movement between the two parts of the shafting is concerned, connections between the device and operating lever, throwing the device with movement of the operating lever in clutch setting direction, variable transmission gearing connected with one part of the shafting and a connection from the transmission gearing interlocking with the operating lever, preventing movement thereof effective to engage the coupling parts to prevent braking on selected gear ratios.

17. In a device of the character stated, an engine, an engine clutch connected therewith, interrupted shafting connected with the clutch, a brake member connected with the shafting adjacent the engine clutch, an operating lever for one engine clutch member, a brake member connected with said lever coöperating with the first brake member, an overrunning clutch connected with the two parts of the shafting to rotate one by the other in one direction and allow movement between them in the opposite direction, coupling parts connected with the two parts of the shafting and one of them movable, a device engaging the movable coupling member to connect it and render the overrunning clutch inoperative so far as allowing movement between the two parts of the shafting is concerned, connections between the device and operating lever throwing the device with movement of the operating lever in clutch setting direction, variable speed transmission mechanism connected with one part of the shafting, a connection from the transmission mechanism interlocking with the operating lever, preventing movement thereof effective to engage the coupling parts and hand operated means interlocking with said lever for the same purpose.

18. In a device of the character stated, an engine, an engine clutch connected therewith, interrupted shafting connected with the clutch, a brake member connected with the shafting adjacent the clutch, an operating lever for one clutch member, a brake member connected with said lever coöperating with the first brake member, an overrunning clutch connected with the two parts of the shafting to rotate one part by the other in one direction and allow movement between them in the opposite direction, coupling parts connected with the two parts of the shaft and one of them movable, a device engaging the movable coupling member to connect the coupling parts and render the overrunning clutch inoperative so far as allowing movement between the two parts of the shafting is concerned, connections between the device and operating lever throwing the device with movement of the operating lever in clutch setting direction, variable speed transmission mechanism connected with one part of the interrupted shafting, a hand lever and a connection from the hand lever interlocking with the clutch operating lever in one position to prevent engagement of the coupling parts.

19. In a device of the character stated, an engine, an engine clutch connected therewith, interrupted shafting connected with the clutch, a brake member connected with the shafting adjacent the clutch, an operating lever for one clutch member, a brake member connected with said lever and coöperating with the first brake member, an overrunning clutch connected with the two parts of the shafting to rotate one part by the other in one direction and allow movement between them in the opposite direction, coupling parts connected with the two parts of the shafting and one of them movable, a device engaging the movable coupling member to connect the members and render the overrunning clutch inoperative so far as allowing movement between the two parts of the shafting is concerned, connections between the device and operating lever throwing the device with movement of the operating lever in clutch setting direction, variable speed transmission mechanism connected with one of the parts of the interrupted shafting, a lever throwing part of said mechanism and having two positions, connections from the lever interlocking with the clutch operating lever in one of these positions to automatically block movement such thereof as would cause engagement of the coupling members.

20. In a device of the character stated, an engine, an engine clutch, a three position clutch lever therefor, a shaft connected with the driven engine clutch member and interrupted, an overrunning clutch at the point of interruption having its parts connected with different shaft parts, means for securing the parts of the overrunning clutch to cause them to rotate together, said means being operated by the clutch lever in its third position, gear changing mechanism, an operating lever for the gear changing mechanism and means for preventing the clutch lever from moving to its third position put into operation by said operating lever in one of the positions of the gear changing mechanism.

WILLIAM E. HAUPT.

Witnesses:
WM. STEELL JACKSON,
HELEN I. KAUFFMAN GEORGE.